United States Patent
Yoshida et al.

(10) Patent No.: US 8,061,125 B2
(45) Date of Patent: Nov. 22, 2011

(54) EXHAUST GAS PURIFICATION SYSTEM AND METHOD FOR INTERNAL COMBUSTION ENGINE

(75) Inventors: Kohei Yoshida, Gotenba (JP); Hiromasa Nishioka, Susono (JP); Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 497 days.

(21) Appl. No.: 12/310,066

(22) PCT Filed: Aug. 29, 2007

(86) PCT No.: PCT/IB2007/002476
§ 371 (c)(1),
(2), (4) Date: Feb. 10, 2009

(87) PCT Pub. No.: WO2008/029239
PCT Pub. Date: Mar. 13, 2008

(65) Prior Publication Data
US 2009/0199548 A1 Aug. 13, 2009

(30) Foreign Application Priority Data
Aug. 30, 2006 (JP) ................................. 2006-233279

(51) Int. Cl.
*F01N 3/00* (2006.01)
(52) U.S. Cl. ............... 60/286; 60/274; 60/285; 60/295; 60/301
(58) Field of Classification Search ............ 60/274, 60/285–287, 295–301
See application file for complete search history.

(56) References Cited

U.S. PATENT DOCUMENTS

| 6,823,658 B2 * | 11/2004 | Kuroda et al. | 60/277 |
| 7,454,900 B2 * | 11/2008 | Hayashi | 60/295 |
| 2001/0025486 A1 | 10/2001 | Ogiso et al. | |
| 2005/0060987 A1 * | 3/2005 | Nakano et al. | 60/285 |

(Continued)

FOREIGN PATENT DOCUMENTS

EP 1 515 030 A2 3/2005

(Continued)

OTHER PUBLICATIONS

European Office Action issued in European Application No. 07804847.7 dated Apr. 15, 2011.

*Primary Examiner* — Thomas Denion
*Assistant Examiner* — Jesse Bogue
(74) *Attorney, Agent, or Firm* — Oliff & Berridge, PLC

(57) ABSTRACT

Engine air-fuel ratio controlling means is provided to control an exhaust air-fuel ratio that is the ratio between the air contained in the exhaust gas discharged from the engine and the fuel element contained in the same exhaust gas and acting as a reducing agent at a NOx catalyst by controlling the air-fuel ratio of the gas combusted in the engine. Fuel adding means is provided upstream of the NOx catalyst in an exhaust passage to add fuel into the exhaust gas. During the SOx poisoning recovery control, when developing a state enabling SOx reduction reactions, the exhaust gas air-fuel ratio of the exhaust gas discharged from the engine and the amount of fuel added from the fuel adding means are controlled to minimize the sum of the amount of fuel injected in the engine and the amount of fuel added from the fuel adding means.

8 Claims, 2 Drawing Sheets

U.S. PATENT DOCUMENTS

| | | |
|---|---|---|
| 2005/0223698 A1 | 10/2005 | Murata et al. |
| 2005/0229589 A1* | 10/2005 | Murata et al. ............ 60/286 |
| 2009/0019836 A1* | 1/2009 | Nagaoka et al. ............ 60/285 |

FOREIGN PATENT DOCUMENTS

| | | |
|---|---|---|
| EP | 1 529 933 A1 | 5/2005 |
| JP | A-2001-280125 | 10/2001 |
| JP | A-2002-155724 | 5/2002 |
| JP | A-2003-120373 | 4/2003 |
| JP | A-2005-133562 | 5/2005 |
| JP | A-2005-146979 | 6/2005 |
| JP | A-2005-240682 | 9/2005 |
| JP | A-2005-273573 | 10/2005 |
| JP | A-2006-226168 | 8/2008 |

* cited by examiner

EXHAUST GAS PURIFICATION SYSTEM AND METHOD FOR INTERNAL COMBUSTION ENGINE

The disclosure of Japanese Patent Application No. 2006-233279 filed on Aug. 30, 2006, including the specification, drawings and abstract is incorporated herein by reference in its entirety.

BACKGROUND OF THE INVENTION

1. Field of the Invention

The invention relates to an exhaust gas purification system and an exhaust gas purification method for an internal combustion engine having an adsorption-reduction type NOx catalyst provided in the exhaust passage.

2. Description of the Related Art

An exhaust gas purification system for an internal combustions engine has an adsorption-reduction type NOx catalyst (will be simply referred to as "NOx catalyst" where appropriate) provided in an exhaust passage. NOx catalysts adsorb NOx in an exhaust gas under an oxidizing atmosphere and reduce the adsorbed NOx under a reducing atmosphere.

Such NOx catalysts, however, adsorb SOx as well as NOx. Therefore, in an exhaust gas purification system for an internal combustion engine having a NOx catalyst, so-called SOx poisoning recovery control is executed to reduce the SOx adsorbed in the NOx catalyst During the SOx poisoning control, the exhaust gas air-fuel ratio of the exhaust gas entering the NOx catalyst, which is the ratio between the air contained in the exhaust gas entering the NOx catalyst and the fuel element contained in the same exhaust gas and acting as a reducing agent at the NOx catalyst, is reduced to a target exhaust gas air-fuel ratio enabling SOx reduction reactions, and the temperature of the NOx catalyst is increased to a target temperature enabling SOx reduction reactions.

Japanese Patent Application Publication. No. 2002-155724 (JP-A-2002-155724) describes a technology in which the exhaust gas air-fuel ratio is controlled by controlling the amount of fuel injected by a post-injection and/or controlling the amount of fuel added from a fuel addition valve provided upstream of the NOx catalyst. Also, Japanese Patent Application Publication No. 2001-280125 (JP-A-2001-280125) and Japanese Patent Application Publication No. 2003-120373 (JP-A-2003-120373) have been also studied as references. However, none of these related technologies specifically addresses the necessity for minimizing the reduction of the fuel economy that may be caused by the SOx poisoning recovery control.

SUMMARY OF THE INVENTION

In view of the above, the invention provides a technology for minimizing the reduction of the fuel economy that may be caused during the SOx poisoning recovery control executed by an exhaust gas purification system of an internal combustion engine in which a NOx catalyst is provided in an exhaust passage.

To accomplish this object, an aspect of the invention relates to an exhaust gas purification system for an internal combustion engine, which has an engine air-fuel ratio control device that controls the exhaust gas air-fuel ratio of the exhaust gas discharged from the internal combustion engine and a fuel addition device that is provided upstream of a NOx catalyst in the exhaust passage and adds fuel into the exhaust gas. This exhaust gas purification system, when developing a state enabling SOx reduction reactions during the SOx poisoning recovery control, controls the exhaust gas air-fuel ratio of the exhaust gas discharged from the internal combustion engine using the engine air-fuel ratio control device and controls the amount of fuel added from the fuel addition device so as to minimize the sum of the amount of fuel injected in the internal combustion engine and the amount of fuel added from the fuel addition device.

More specifically, the above exhaust gas purification system is an exhaust gas purification system for an internal combustion engine, which has: an adsorption-reduction type NOx catalyst that is provided in an exhaust passage of the internal combustion engine; an engine air-fuel ratio control device that controls an engine-out exhaust gas air-fuel ratio, which is the ratio between the air contained in the exhaust gas discharged from the internal combustion engine and the fuel element contained in the same exhaust gas and acting as a reducing agent at the adsorption-reduction type NOx catalyst, by controlling the air-fuel ratio of the gas to be combusted in the internal combustion engine; a fuel addition device that is provided upstream of the adsorption-reduction type NOx catalyst in the exhaust passage and adds fuel into the exhaust gas; and a SOx poisoning recovery control device that executes a SOx poisoning recovery control for reducing the SOx adsorbed in the adsorption-reduction type NOx catalyst, in which the engine-out exhaust gas air-fuel ratio is controlled by the engine air-fuel ratio control device and fuel is added into the exhaust gas from the fuel addition device so that a catalyst-entering exhaust gas air-fuel ratio, which is the ratio between the air contained in the exhaust gas entering the adsorption-reduction type NOx catalyst and the fuel element contained in the same exhaust gas and acting as a reducing agent at the adsorption-reduction type NOx catalyst, decreases to a target exhaust gas air-fuel ratio enabling SOx reduction reactions and so that the temperature of the adsorption-reduction type NOx catalyst increases to a target temperature enabling SOx reduction reactions. This exhaust gas purification system is characterized in that, when reducing the catalyst-entering exhaust gas air-fuel ratio to the target exhaust gas air-fuel ratio and increasing the temperature of the adsorption-reduction type NOx catalyst to the target temperature, the SOx poisoning recovery control device controls the engine-out exhaust gas air-fuel ratio using the engine air-fuel ratio control device and controls the amount of fuel added from the fuel addition device so as to minimize the sum of the amount of fuel injected in the internal combustion engine and the amount of fuel added from the fuel addition device.

Another aspect of the invention relates to an exhaust gas purification method for an internal combustion engine having an adsorption-reduction type NOx catalyst that adsorbs NOx and reduces the adsorbed NOx using a reducing agent and a fuel addition device that is provided upstream of the adsorption-reduction type NOx catalyst in the exhaust passage and adds fuel into the exhaust gas. This exhaust gas purification method is characterized in that, when reducing a catalyst-entering exhaust gas air-fuel ratio, which is the ratio between the air contained in the exhaust gas entering the adsorption-reduction type NOx catalyst and the fuel element contained in the same exhaust gas and acting as a reducing agent at the adsorption-reduction type NOx catalyst, to a target exhaust gas air-fuel ratio enabling SOx reduction reactions and increasing the temperature of the adsorption-reduction type NOx catalyst to a target temperature enabling SOx reduction reactions, an engine-out exhaust gas air-fuel ratio, which is the ratio between the air contained in the exhaust gas discharged from the internal combustion engine and the fuel element contained in the same exhaust gas and acting as a reducing agent at the adsorption-reduction type NOx catalyst, and the amount of fuel added from the fuel addition device are controlled so as to minimize the sum of the amount of fuel injected in the internal combustion engine and the amount of fuel added from the fuel addition device.

According to the above exhaust gas purification system and method, the reduction of the fuel economy that may be caused during the SOx poisoning recovery control can be minimized.

The above exhaust gas purification system and method of the invention may be such that, when reducing the catalyst-entering exhaust gas air-fuel ratio to the target exhaust gas air-fuel ratio, the engine-out exhaust gas air-fuel ratio is reduced to a level at which the amount of the fuel element contained in the exhaust gas discharged from the internal combustion engine and not acting as a reducing agent at the adsorption-reduction type NOx catalyst (will be referred to as "non-reductive fuel element" where appropriate) reaches an upper limit value, and fuel of an amount needed to compensate for the shortfall in the fuel amount required to reduce the catalyst-entering exhaust gas air-fuel ratio to the target exhaust gas air-fuel ratio is added into the exhaust gas from the fuel addition device.

In the case where the engine-out exhaust gas air-fuel ratio is reduced by reducing the air-fuel ratio of the gas to be combusted in the internal combustion engine, if the air-fuel ratio of the gas to be combusted in the internal combustion engine is excessively reduced, it makes it difficult for the fuel to be combusted sufficiently in the internal combustion engine. In this case, the amount of the non-reductive fuel element (i.e., insufficiently combusted fuel) discharged from the internal combustion engine increases. As the percentage of such fuel turning into a non-reductive fuel element increases, the amount of fuel injected in the internal combustion engine needs to be increased in order to reduce the engine-out exhaust gas air-fuel ratio, that is, in order to increase the amount of fuel acting as a reducing agent at the NOx catalyst.

To cope with this, in the above exhaust gas purification system and method, the engine-out exhaust gas air-fuel ratio is reduced by reducing the air-fuel ratio of the gas to be combusted in the internal combustion engine until the amount of the non-reductive fuel element reaches its upper limit value, and then fuel of an amount needed to compensate for the shortfall in the fuel amount required to reduce the catalyst-entering exhaust gas air-fuel ratio to the target exhaust gas air-fuel ratio is added into the exhaust gas from the fuel addition device.

The upper limit value of the non-reductive fuel element is a threshold used to determine whether the fuel used for further reducing the catalyst-entering exhaust gas air-fuel ratio can be saved by accomplishing the reduction by adding fuel into the exhaust gas from the fuel addition device or by accomplishing the reduction by reducing the engine-out exhaust gas air-fuel ratio by reducing the air-fuel ratio of the gas to be combusted in the internal combustion engine. That is, if the amount of the non-reductive fuel element is larger than the upper limit value, the fuel amount needed to bring about a given reduction of the catalyst-entering exhaust gas air-fuel ratio is considered to be smaller when the same reduction of the catalyst-entering exhaust gas air-fuel ratio is accomplished by adding fuel into the exhaust gas from the fuel addition device than when the same reduction of the catalyst-entering exhaust gas air-fuel ratio is accomplished by reducing the engine-out exhaust gas air-fuel ratio by reducing the air-fuel ratio of the gas to be combusted in the internal combustion engine.

As such, the catalyst-entering exhaust gas air-fuel ratio can be reduced to the target exhaust gas air-fuel ratio while minimizing the sum of the amount of fuel injected in the internal combustion engine and the amount of fuel added from the fuel addition device.

Further, the above exhaust gas purification system and method of the invention may be such that, if the temperature of the adsorption-reduction type NOx catalyst is still lower than the target temperature after the catalyst-entering exhaust gas air-fuel ratio has been reduced to the target exhaust gas air-fuel ratio, the amount of fuel added from the fuel addition device is increased such that the temperature of the adsorption-reduction type NOx catalyst increases to the target temperature.

As the amount of fuel injected from the fuel addition device is increased, the amount of fuel oxidized at the NOx catalyst increases, whereby the temperature of the NOx catalyst increases.

However, if the amount of fuel added from the fuel addition device is increased as described above, the catalyst-entering exhaust gas air-fuel ratio decreases below the target exhaust air-fuel ratio. To counter this, the engine-out exhaust gas air-fuel ratio may be increased by an amount corresponding to the increase in the amount of fuel added from the fuel addition device, so that the catalyst-entering exhaust gas air-fuel ratio equals to the target exhaust gas air-fuel ratio.

As such, the catalyst-entering exhaust gas air-fuel ratio can be reduced to the target exhaust gas air-fuel ratio while minimizing the sum of the amount of fuel injected in the internal combustion engine and the amount of fuel added from the fuel addition device.

As describe above, the invention can minimize the reduction of the fuel economy that may be caused during the SOx poisoning recovery control executed by an exhaust gas purification system of an internal combustion engine in which a NOx catalyst is provided in an exhaust passage.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in more detail with reference to exemplary embodiments.

Figure 1:
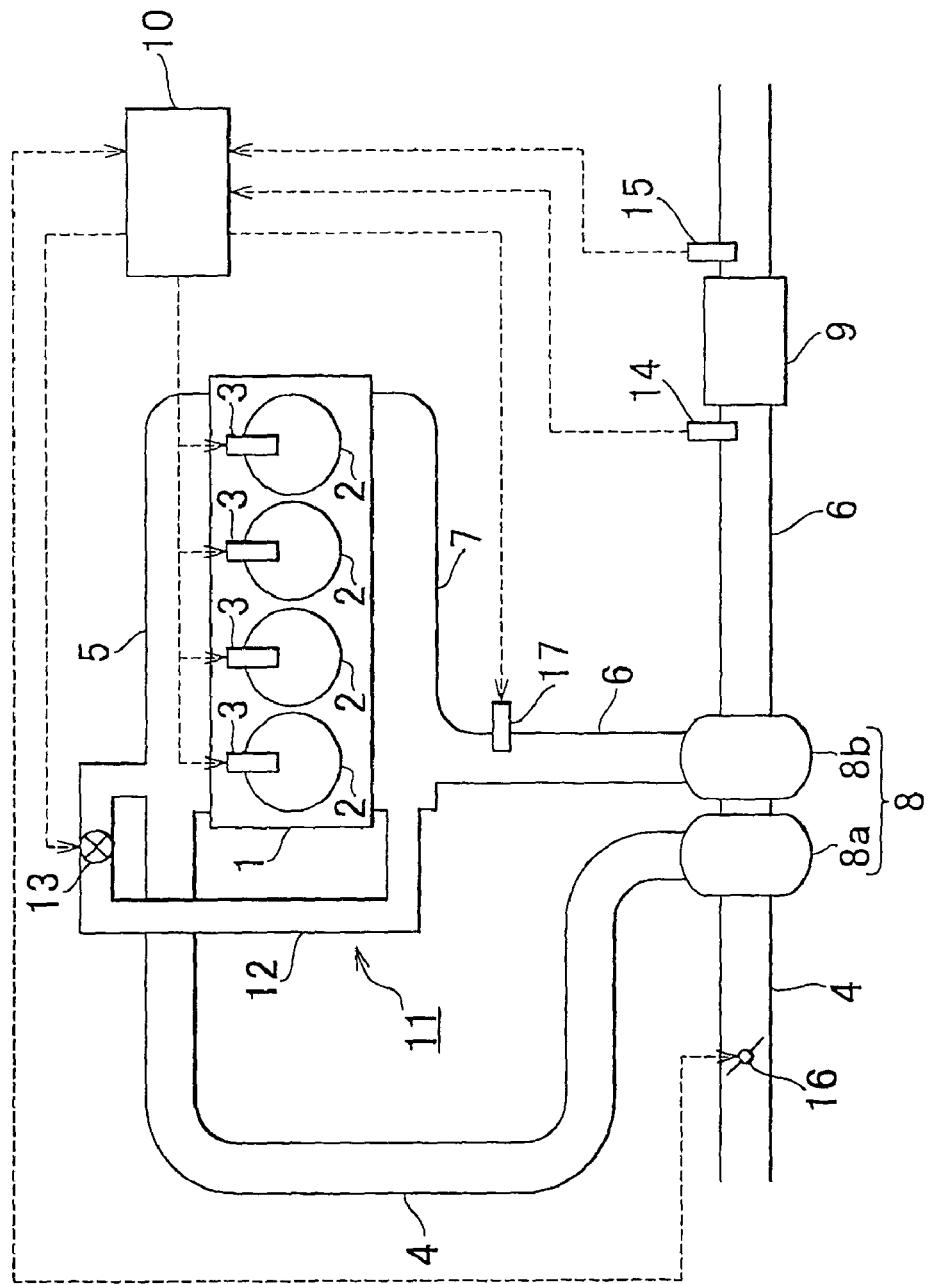
FIG. 1 is a view schematically showing the structures of an internal combustion engine according to an exemplary embodiment of the invention and its intake system.

To begin with, the outline of the structures of an internal combustion engine according to an exemplary embodiment of the invention and its intake system will be described. FIG. 1 schematically shows the structures of an internal combustion engine 1 of the exemplary embodiment and its intake system. The internal combustion engine 1 is a diesel engine for vehicles. The internal combustion engine 1 has four cylinders 2. Fuel injection valves 3 are provided in the respective cylinders 2. The fuel injection valves 3 directly inject fuel into the respective cylinders 2.

An intake manifold 5 and an exhaust manifold 7 are connected to the internal combustion engine 1. One end of an intake passage 4 is connected to the intake manifold 5, and one end of an exhaust passage 6 is connected to the exhaust manifold 7.

A compressor 8a of a turbocharger (supercharging device) 8 is provided in the intake passage 4. A turbine 8b of the turbocharger 8 is provided in the exhaust passage 6. A throttle valve 16 is provided upstream of the compressor 8a in the intake passage 4.

A fuel addition valve 17 is provided upstream of the turbine 8b in the exhaust passage 6. The fuel addition valve 17 is used to add fuel into the exhaust gas. A NOx catalyst 9 is provided downstream of the turbine 8b in the exhaust passage 6. Further, an air-fuel ratio sensor 14 for detecting an exhaust gas air-fuel ratio of the exhaust gas is provided upstream of the NOx catalyst 9 in the exhaust passage 6. A temperature sensor 15 for detecting the exhaust gas temperature is provided downstream of the NOx catalyst 9 in the exhaust passage 6. Note that the "exhaust gas air-fuel ratio" represents the ratio between the air contained in an exhaust gas and the fuel element contained in the same exhaust gas and acting as a reducing agent at the NOx catalyst 9.

Further, the intake system of the internal combustion engine 1 of this exemplary embodiment is equipped with an EGR apparatus 11 that distributes an exhaust gas to the intake system as an EGR gas. The EGR apparatus 11 has an EGR passage 12 that is connected at one end to the exhaust manifold 7 and at the other end to the intake manifold 5. The EGR gas is distributed from the exhaust manifold 7 to the intake manifold 5 via the EGR passage 12. Further, an EGR valve 13 for controlling the amount of the EGR gas distributed to the intake manifold 5 is provided in the EGR passage 12.

The internal combustion engine 1 is provided with an electronic control unit (ECU) 10. The air-fuel ratio sensor 14 and the temperature sensor 15 are electrically connected to the ECU 10, and the ECU 10 receives signals from these sensors. The ECU 10 estimates the temperature of the NOx catalyst 9 based on the values detected by the temperature sensor 15.

The fuel injection valve 3, the throttle valve 16, the fuel addition valve 17, and the EGR valve 13 are electrically connected to the ECU 10, and the ECU 10 controls these valves.

Next, the SOx poisoning recovery control executed in this exemplary embodiment will be described. In the internal combustion engine 1, the SOx poisoning recovery control is executed to reduce the SOx adsorbed in the NOx catalyst 9. During the SOx poisoning recovery control, it is necessary to reduce the exhaust gas air-fuel ratio of the exhaust gas entering the NOx catalyst 9 (will hereinafter be referred to as "catalyst-entering exhaust gas") to a target exhaust gas air-fuel ratio enabling SOx reduction reactions and reduce the temperature of the NOx catalyst 9 to a target temperature enabling SOx reduction reactions.

The exhaust gas air-fuel ratio of the exhaust gas discharged from the internal combustion engine 1 (will hereinafter be referred to as "engine-out exhaust gas") can be reduced by reducing the air-fuel ratio of the gas combusted in each cylinder 2 of the internal combustion engine 1. Thus, the exhaust gas air-fuel ratio of the catalyst-entering exhaust gas can be reduced by reducing the air-fuel ratio of the gas combusted in each cylinder 2.

For example, the exhaust gas air-fuel ratio of the engine-out exhaust gas can be reduced by: (1) reducing the intake air amount by reducing the opening degree of the throttle valve 16; (2) increasing the amount of EGR gas by increasing the opening degree of the EGR valve 13; (3) retarding the fuel injection timing of each fuel injection valve 3 and increasing the fuel injection amount; and (4) reducing the main injection amount and performing a post-injection at a time that is later than the main fuel injection and at which the injected main fuel is combusting. In this exemplary embodiment, the exhaust gas air-fuel ratio of the engine-out exhaust gas is reduced by implementing one of these methods (1) to (4) or by implementing two or more of them in combination.

Assuming that the fuel injected from each fuel injection valve 3 can be sufficiently combusted in the cylinder 2 to generate torque during the implementation of a selected one or more of the foregoing methods (1) to (4), the fuel economy can be maintained even when the exhaust gas air-fuel ratio of the engine-out exhaust gas is being reduced using the foregoing methods (1) to (4).

However, in fact, if the exhaust gas air-fuel ratio of the engine-out exhaust gas is excessively reduced during the implementation of a selected one or more of the above-described methods (1) to (4), the fuel injected from the fuel injection valves 3 can not be sufficiently combusted in the cylinders 2, and this increases the amount of smoke discharged from the internal combustion engine 1. Because this smoke does not act as a reducing agent at the NOx catalyst 9, as the percentage of fuel that turns into such smoke after injected from the fuel injection valves 3 increases, the amount of fuel injected from the fuel injection valves 3 needs to be increased in order to reduce the exhaust gas air-fuel ratio of the engine-out exhaust gas (i.e., in order to increase the amount of fuel that acts as a reducing agent at the NOx catalyst 9). In this exemplary embodiment, the foregoing smoke corresponds to "non-reductive fuel element".

Meanwhile, another option for reducing the exhaust gas air-fuel ratio of the catalyst-entering exhaust gas is to add fuel into the exhaust gas from the fuel addition valve 17. The fuel injected from the fuel addition valve 17 does not turn into smoke although it does not contribute to the generation of torque.

Thus, for the purpose of reducing the exhaust gas air-fuel ratio of the catalyst-entering exhaust gas down to the target exhaust gas air-fuel ratio and increasing the temperature of the NOx catalyst 9 up to the target temperature, in the SOx poisoning recovery control of this exemplary embodiment, the exhaust gas air-fuel ratio of the engine-out exhaust gas is reduced and the amount of fuel added from the fuel addition valve 17 is controlled so as to minimize the sum of the amount of fuel injected from the fuel injection valves 3 and the amount of fuel injected from the fuel addition valve 17.

Figure 2:
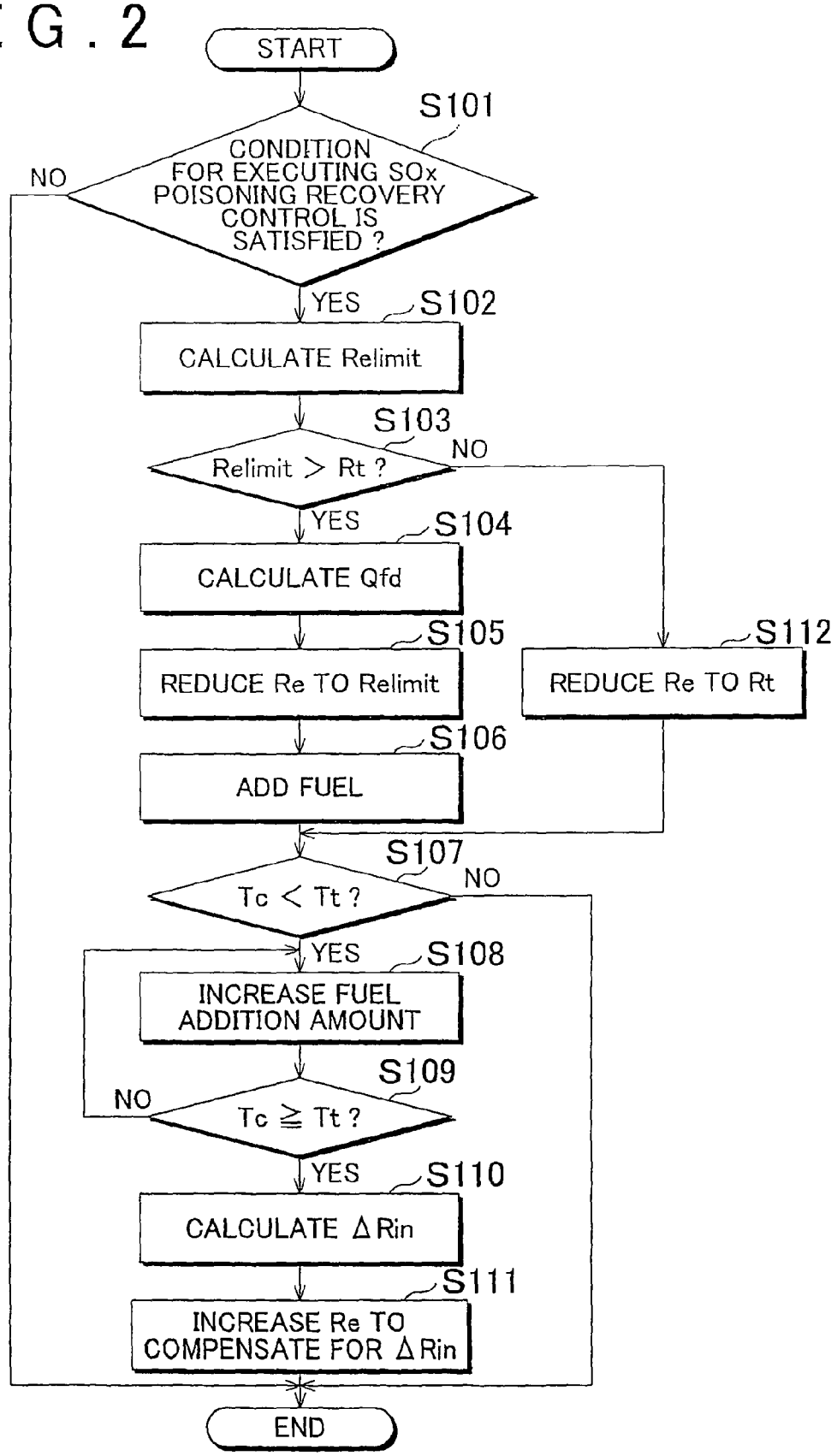
FIG. 2 is a flowchart showing the routine of the SOx poisoning recovery control executed in the exemplary embodiment.

Hereinafter, the routine of the SOx poisoning recovery control executed in this exemplary embodiment will be described with reference to the flowchart shown in FIG. 2. This control routine is prestored in the ECU 10 and is repeatedly executed at predetermined time intervals during the operation of the internal combustion engine 1.

In this control routine, the ECU 10 first determines whether the condition for executing the SOx poisoning recovery control is presently in effect in step 101. This condition is, for example, that a predetermined time has passed since the SOx poisoning recovery control was executed the last time. If a positive determination is made in step 101, the ECU 10 then proceeds to step 102. If a negative determination is made, the ECU 10 finishes the present cycle of the control routine.

In step 102, the ECU 10 calculates a lower limit value Relimit of an exhaust gas air-fuel ratio Re of the engine-out exhaust gas. The lower limit value Relimit is used when reducing the exhaust gas air-fuel ratio Re using a selected one or more of the methods (1) to (4). The lower limit value Relimit corresponds to an exhaust gas air-fuel ratio at which the amount of smoke discharged from the internal combustion engine 1 reaches its upper limit value. This upper limit value is a threshold used to determine whether the fuel used for father reducing an exhaust gas air-fuel ratio Rin of the catalyst-entering exhaust gas can be saved by accomplishing the reduction by adding fuel into the exhaust gas from the fuel addition valve 17 or by accomplishing the reduction by reducing the exhaust air-fuel ratio Re of the engine-out exhaust gas by reducing the air-fuel ratio of the gas to be combusted in the internal combustion engine 1. That is, if the amount of smoke is larger than the upper limit value, the fuel amount needed to bring about a given reduction of the exhaust gas air-fuel ratio Rin of the catalyst-entering exhaust gas is considered to be smaller when the same reduction of the exhaust gas air-fuel ratio Rin is accomplished by adding fuel into the exhaust gas from the fuel addition valve 17 than when the same reduction of the exhaust gas air-fuel ratio Rin is accomplished by reducing the exhaust gas air-fuel ratio Re of the engine-out exhaust gas by reducing the air-fuel ratio of the gas to be combusted in the internal combustion engine 1.

The method for reducing the exhaust gas air-fuel ratio Re of the engine-out exhaust gas is selected from among the foregoing methods (1) to (4) in accordance with the operation state of the internal combustion engine 1. The lower limit value Relimit of the exhaust gas air-fuel ratio Re is set in accordance with the operation state of the internal combustion engine 1.

After step 102, the ECU 10 proceeds to step 103 and determines whether the lower limit value Relimit is larger than a target exhaust gas air-fuel ratio Rt. If a positive determination is made in step 103, the ECU 10 proceeds to step 104. If a negative determination is made in step 103, it means that the exhaust gas air-fuel ratio Rin of the catalyst-entering exhaust gas can be reduced down to the target exhaust gas air-fuel ratio Rt only by reducing the exhaust gas air-fuel ratio Re of the engine-out exhaust gas to the target exhaust gas air-fuel ratio Rt. In this case, therefore, the ECU 10 proceeds to step 112.

On the other hand, in step 104, the ECU 10 calculates a fuel shortfall Qfd that is the amount of fuel that will be additionally required to further reduce the exhaust gas air-fuel ratio Rin of the catalyst-entering exhaust gas to the target exhaust gas air-fuel ratio Rt after reducing the exhaust gas air-fuel ratio Re of the engine-out exhaust gas to the lower limit value Relimit.

Then, the ECU 10 proceeds to step 105 and reduces the exhaust gas air-fuel ratio Re of the engine-out exhaust gas down to the lower limit value Relimit using a selected one or more of the foregoing methods (1) to (4).

Then, the ECU 10 proceeds to step 106 and controls the fuel addition valve 17 to add, into the exhaust gas, fuel of an amount corresponding to the fuel shortfall Qfd, whereby the exhaust gas air-fuel ratio Rin of the catalyst-entering exhaust gas equals the target exhaust gas air-fuel ratio Rt.

Next, the ECU 10 proceeds to step 107 and determines whether a temperature Tc of the NOx catalyst 9 is presently lower than a target temperature Tt. If a positive determination is made in step 107, the ECU 10 proceeds to step 108. If a negative determination is made in step 108, it means that the exhaust gas air-fuel ratio Rin of the catalyst-entering exhaust gas is presently equal to the target exhaust gas air-fuel ratio Rt and the temperature Tc of the NOx catalyst 9 is equal to or higher than the target temperature Tt, that is, reduction reactions of the SOx adsorbed in the NOx catalyst 9 can occur. In this case, therefore, the ECU 10 finishes the present cycle of the control routine.

On the other hand, in step 108, the ECU 10 increases the amount of fuel added from the fuel addition valve 17. Thus, the amount of fuel oxidized at the NOx catalyst 9 increases, and therefore the oxidization heat generated by the oxidization of fuel increases, whereby the temperature of the NOx catalyst increases.

Next, the ECU 10 proceeds to step 109 and determines whether the temperature Tc of the NOx catalyst 9 has become equal to or higher than the target temperature Tt. If a positive determination is made in step 109, the ECU 10 proceeds to step 110. If a negative determination is made in step 109, the ECU 10 returns to step 108 and further increases the amount of fuel added from the fuel addition valve 17.

In step 110, the ECU 10 calculates a decrease amount ΔRin that is the amount by which the exhaust gas air-fuel ratio Rin of the catalyst-entering exhaust gas has decreased due to the increase in the amount of fuel added from the fuel addition valve 17.

Then, the ECU 10 proceeds to step 111 and performs a control that increases the exhaust gas air-fuel ratio Re of the engine-out exhaust gas by an amount corresponding to the calculated decrease amount ΔRin. In this way, the temperature Tc of the NOx catalyst 9 is made equal to or higher than the target temperature Tt and the exhaust gas air-fuel ratio Rin of the catalyst-entering exhaust gas is made equal to the target exhaust gas air-fuel ratio Rt, that is, a state where reduction reactions of the SOx adsorbed in the NOx catalyst 9 occur is developed. After step 111, the ECU 10 finishes the present cycle of the control routine.

On the other hand, in step 112, the ECU 10 reduces the exhaust gas air-fuel ratio Re of the engine-out exhaust gas down to the target exhaust gas air-fuel ratio Rt using a selected one or more of the foregoing methods (1) to (4). Then, the ECU 10 proceeds to step 107 and to step 108. In step 108, the ECU 10 controls the fuel addition valve 17 to add fuel into exhaust gas, after which the ECU 10 proceeds to step 109.

As such, the control routine described above minimizes the sum of the amount of fuel injected from the fuel injection valves 3 and the amount of fuel added from the fuel addition valve 17 when reducing the exhaust gas air-fuel ratio Rin of the catalyst-entering exhaust gas to the target exhaust gas air-fuel ratio Rt and increasing the temperature Tc of the NOx catalyst 9 to the target temperature Tt.

According to this exemplary embodiment, therefore, it is possible to minimize the reduction of the fuel economy that may be caused by the SOx poisoning recovery control.

In the exemplary embodiment described above, the smoke discharged from the engine is recited as an example of "non-reductive fuel element". However, if the fuel injected from the fuel injection valve 3 is not sufficiently combusted in the cylinder 2, the uncombusted fuel may turn into soot. The soot, like the smoke described above, does not act as a reducing agent at the NOx catalyst 9. Therefore, in the SOx poisoning recovery control described above, the lower limit value Relimit of the exhaust gas air-fuel ratio Re of the engine-out exhaust gas may be set to a value at which the amount of soot reaches its upper limit value. Like the above-described upper limit value of the smoke amount, the upper limit value of the soot amount is a threshold used to determine whether the fuel used for further reducing the exhaust gas air-fuel ratio Rin of the catalyst-entering exhaust gas can be saved by accomplishing the reduction by adding fuel into the exhaust gas from the fuel addition valve 17 or by accomplishing the reduction by reducing the exhaust air-fuel ratio Re by reducing the air-fuel ratio of the gas to be combusted in the internal combustion engine 1. That is, if the amount of soot is larger than the upper limit value, the fuel amount needed to bring about a given reduction of the exhaust gas air-fuel ratio Rin of the catalyst-entering exhaust gas is considered to be smaller when the same reduction of the exhaust gas air-fuel ratio Rin is accomplished by adding fuel into the exhaust gas from the fuel addition valve 17 than when the same reduction of the exhaust gas air-fuel ratio Rin is accomplished by reducing the exhaust gas air-fuel ratio Re of the engine-out exhaust gas by reducing the air-fuel ratio of the gas to be combusted in the internal combustion engine 1.

What is claimed is:

1. An exhaust gas purification system for an internal combustion engine, comprising:
    an adsorption-reduction type NOx catalyst that is provided in an exhaust passage of the internal combustion engine and adsorbs NOx and reduces the adsorbed NOx using a reducing agent;
    an engine air-fuel ratio control device that controls an engine-out exhaust gas air-fuel ratio, which is the ratio-between an air contained in an exhaust gas discharged from the internal combustion engine and a fuel element contained in the same exhaust gas and acting as a reducing agent at the adsorption-reduction type NOx catalyst, by controlling the air-fuel ratio of a gas to be combusted in the internal combustion engine;
    a fuel addition device that is provided upstream of the adsorption-reduction type NOx catalyst in the exhaust passage and adds fuel into an exhaust gas;
    a SOx poisoning recovery control device that executes a SOx poisoning recovery control for reducing SOx adsorbed in the adsorption-reduction type NOx catalyst, in which the engine-out exhaust gas air-fuel ratio is controlled by the engine air-fuel ratio control device and fuel is added into the exhaust gas from the fuel addition device such that a catalyst-entering exhaust gas air-fuel ratio, which is the ratio between an air contained in an exhaust gas entering the adsorption-reduction type NOx catalyst and a fuel element contained in the same exhaust gas and acting as a reducing agent at the adsorption-reduction type NOx catalyst, decreases to a target exhaust gas air-fuel ratio enabling SOx reduction reactions and such that the temperature of the adsorption-reduction type NOx catalyst increases to a target temperature enabling SOx reduction reactions, the exhaust gas purification system being characterized in that:
    when reducing the catalyst-entering exhaust gas air-fuel ratio to the target exhaust gas air-fuel ratio and increasing the temperature of the adsorption-reduction type NOx catalyst to the target temperature, the SOx poisoning recovery control device controls the engine-out exhaust gas air-fuel ratio using the engine air-fuel ratio control device and controls the amount of fuel added from the fuel addition device so as to minimize the sum of the amount of fuel injected in the internal combustion engine and the amount of fuel added from the fuel addition device;
    when reducing the catalyst-entering exhaust gas air-fuel ratio to the target exhaust gas air-fuel ratio, the SOx poisoning recovery control device reduces the engine-out exhaust gas air-fuel ratio to a level at which the amount of a fuel element contained in the exhaust gas discharged from the internal combustion engine and not acting as a reducing agent at the adsorption-reduction type NOx catalyst reaches an upper limit value, and the SOx poisoning recovery control device controls the fuel addition device to add, into the exhaust gas, fuel of an amount needed to compensate for the shortfall in the fuel amount required to reduce the catalyst-entering exhaust gas air-fuel ratio to the target exhaust gas air-fuel ratio;
    wherein the upper limit value of the non-reductive fuel element is a threshold used to determine whether the fuel used for further reducing the catalyst-entering exhaust gas air-fuel ratio can be saved by accomplishing the reduction by adding fuel into the exhaust gas from the fuel addition device or by accomplishing the reduction by reducing the engine-out exhaust gas air-fuel ratio by reducing the air-fuel ratio of the gas to be combusted in the internal combustion engine; and
    wherein, if the amount of the non-reductive fuel element is larger than the upper limit value, the fuel amount needed to bring about a given reduction of the catalyst-entering exhaust gas air-fuel ratio is considered to be smaller when the same reduction of the catalyst-entering exhaust gas air-fuel ratio is accomplished by adding fuel into the exhaust gas from the fuel addition device than when the same reduction of the catalyst-entering exhaust gas air-fuel ratio is accomplished by reducing the engine-out exhaust gas air-fuel ratio by reducing the air-fuel ratio of the gas to be combusted in the internal combustion engine.

2. The exhaust gas purification system according to claim 1, wherein
    if the temperature of the adsorption-reduction type NOx catalyst is still lower than the target temperature after the catalyst-entering exhaust gas air-fuel ratio has been reduced to the target exhaust gas air-fuel ratio, the SOx poisoning recovery control device increases the amount of fuel added from the fuel addition device such that the temperature of the adsorption-reduction type NOx catalyst increases to the target temperature.

3. The exhaust gas purification system according to claim 2, wherein
    when controlling the catalyst-entering exhaust gas air-fuel ratio to the target exhaust gas air-fuel ratio, the SOx poisoning recovery control device increases, using the engine air-fuel ratio control device, the engine-out exhaust gas air-fuel ratio by an amount corresponding to the amount by which the catalyst-entering exhaust gas air-fuel ratio has decreased due to the increase in the amount of fuel added from the fuel addition device.

4. The exhaust gas purification system according to claim 1, wherein
    when controlling the catalyst-entering exhaust gas air-fuel ratio to the target exhaust gas air-fuel ratio, the SOx poisoning recovery control device increases, using the engine air-fuel ratio control device, the engine-out exhaust gas air-fuel ratio by an amount corresponding to the amount by which the catalyst-entering exhaust gas air-fuel ratio has decreased due to the increase in the amount of fuel added from the fuel addition device.

5. An exhaust gas purification method for an internal combustion engine including: an adsorption-reduction type NOx catalyst that is provided in an exhaust passage of the internal combustion engine and adsorbs NOx and reduces the adsorbed NOx using a reducing agent; and a fuel addition device that is provided upstream of the adsorption-reduction type NOx catalyst in the exhaust passage and adds fuel into an exhaust gas, the exhaust gas purification method being characterized in that:
    when reducing a catalyst-entering exhaust gas air-fuel ratio, which is the ratio between an air contained in an exhaust gas entering the adsorption-reduction type NOx catalyst and a fuel element contained in the same exhaust gas and acting as a reducing agent at the adsorption-reduction type NOx catalyst, to a target exhaust gas air-fuel ratio enabling SOx reduction reactions and increasing the temperature of the adsorption-reduction type NOx catalyst to a target temperature enabling SOx reduction reactions, an engine-out exhaust gas air-fuel ratio, which is the ratio between an air contained in an exhaust gas discharged from the internal combustion engine and a fuel element contained in the same exhaust gas and acting as a reducing agent at the adsorption-reduction type NOx catalyst, and the amount of fuel added from the fuel addition device are controlled so as to minimize the sum of the amount of fuel injected in the internal combustion engine and the amount of fuel added from the fuel addition device;

when reducing the catalyst-entering exhaust gas air-fuel ratio to the target exhaust gas air-fuel ratio, the engine-out exhaust gas air-fuel ratio is reduced to a level at which the amount of a fuel element contained in the exhaust gas discharged from the internal combustion engine and not acting as a reducing agent at the adsorption-reduction type NOx catalyst reaches an upper limit value, and fuel of an amount needed to compensate for the shortfall in the fuel amount required to reduce the catalyst-entering exhaust gas air-fuel ratio to the target exhaust gas air-fuel ratio is added into the exhaust gas from the fuel addition device;

wherein the upper limit value of the non-reductive fuel element is a threshold used to determine whether the fuel used for further reducing the catalyst-entering exhaust gas air-fuel ratio can be saved by accomplishing the reduction by adding fuel into the exhaust gas from the fuel addition device or by accomplishing the reduction by reducing the engine-out exhaust gas air-fuel ratio by reducing the air-fuel ratio of the gas to be combusted in the internal combustion engine; and wherein, if the amount of the non-reductive fuel element is larger than the upper limit value, the fuel amount needed to bring about a given reduction of the catalyst-entering exhaust gas air-fuel ratio is considered to be smaller when the same reduction of the catalyst-entering exhaust gas air-fuel ratio is accomplished by adding fuel into the exhaust gas from the fuel addition device than when the same reduction of the catalyst-entering exhaust gas air-fuel ratio is accomplished by reducing the engine-out exhaust gas air-fuel ratio by reducing the air-fuel ratio of the gas to be combusted in the internal combustion engine.

6. The exhaust gas purification method according to claim 5, wherein if the temperature of the adsorption-reduction type NOx catalyst is still lower than the target temperature after the catalyst-entering exhaust gas air-fuel ratio has been reduced to the target exhaust gas air-fuel ratio, the amount of fuel added from the fuel addition device is increased such that the temperature of the adsorption-reduction type NOx catalyst increases to the target temperature.

7. The exhaust gas purification method according to claim 6, wherein when controlling the catalyst-entering exhaust gas air-fuel ratio to the target exhaust gas air-fuel ratio, the engine-out exhaust gas air-fuel ratio is increased by an amount corresponding to the amount by which the catalyst-entering exhaust gas air-fuel ratio has decreased due to the increase in the amount of fuel added from the fuel addition device.

8. The exhaust gas purification method according to claim 5, wherein when controlling the catalyst-entering exhaust gas air-fuel ratio to the target exhaust gas air-fuel ratio, the engine-out exhaust gas air-fuel ratio is increased by an amount corresponding to the amount by which the catalyst-entering exhaust gas air-fuel ratio has decreased due to the increase in the amount of fuel added from the fuel addition device.

* * * * *